US009038014B2

(12) United States Patent
Sivaramakrishnan et al.

(10) Patent No.: US 9,038,014 B2
(45) Date of Patent: May 19, 2015

(54) INTELLIGENTLY RECOMMENDING SCHEMAS BASED ON USER INPUT

(75) Inventors: Hariharan Sivaramakrishnan, Bellevue, WA (US); Anthony Nino Bice, Seattle, WA (US); David Mancini, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 806 days.

(21) Appl. No.: 13/326,645

(22) Filed: Dec. 15, 2011

(65) Prior Publication Data
US 2013/0159960 A1 Jun. 20, 2013

(51) Int. Cl.
G06F 9/44 (2006.01)

(52) U.S. Cl.
CPC ........................................ G06F 8/20 (2013.01)

(58) Field of Classification Search
None
See application file for complete search history.

(56) References Cited

U.S. PATENT DOCUMENTS

| | | | | |
|---|---|---|---|---|
| 7,720,720 | B1 * | 5/2010 | Sharma et al. | 705/26.7 |
| 8,645,825 | B1 * | 2/2014 | Cornea et al. | 715/257 |
| 2003/0131069 | A1 * | 7/2003 | Lucovsky et al. | 709/217 |
| 2005/0102303 | A1 * | 5/2005 | Russell et al. | 707/101 |
| 2005/0172261 | A1 * | 8/2005 | Yuknewicz et al. | 717/106 |
| 2006/0041838 | A1 | 2/2006 | Khan | |
| 2006/0117057 | A1 * | 6/2006 | Legault et al. | 707/102 |
| 2006/0129929 | A1 * | 6/2006 | Weber et al. | 715/538 |
| 2009/0006448 | A1 * | 1/2009 | Pall et al. | 707/102 |
| 2013/0159960 | A1 * | 6/2013 | Sivaramakrishnan et al. | 717/100 |
| 2013/0305229 | A1 * | 11/2013 | King et al. | 717/146 |

FOREIGN PATENT DOCUMENTS

| | | |
|---|---|---|
| CN | 1815441 A | 8/2006 |
| JP | 2006-164090 A | 6/2006 |

OTHER PUBLICATIONS

"Discovery-based Edit Assistance for Spreadsheets"—By Jacome Cunha et al., Published by 2009 IEEE Symposium on Visual Languages and Human-Centric Computing (VL/HCC).*
"A Context-Aware Analysis Scheme for Bloom's Taxonomy"—By Tara Kelly, et al.—Published by Proceedings of the 14th IEEE International Conference on Program Comprehension (ICPC'06).*

(Continued)

Primary Examiner — Isaac T Tecklu
Assistant Examiner — Hossain Morshed
(74) Attorney, Agent, or Firm — Jim Banowsky; Leonard Smith; Micky Minhas

(57) ABSTRACT

The present invention extends to methods, systems, and computer program products for intelligently recommending schemas based on user input that defines a portion of a data structure. An intelligent auto-complete function can identify characteristics of the user input and, based on these characteristics, recommend schemas that are most likely to be selected by the user to complete the data structure or portion of the data structure. The identified characteristics of the user input can be compared to characteristics of defined schemas or of other data structures to identify schemas that are most likely to match the user's intent. These schemas are then recommended to the user. Such schemas can define the recommended shape of the data structure being defined, including data types for a particular column, columns to add to the data structure, or can define additional data structures to be added such as additional tables to a database.

19 Claims, 8 Drawing Sheets

(56) References Cited

OTHER PUBLICATIONS

"SnipSuggest: ContextAware Autocompletion for SQL"—By Nodira Khoussainova, et al.—Presented at the 37th International Conference on Very Large Data Bases, Aug. 29 Sep. 3, 2011, Seattle, Washington.*

Nikhil Kothari's Weblog : Metadata-based futellisense—Published at http://\VWw.nikhilk.netJMetadataBasecD:ntellisense.aspx, Aug. 30, 2011.*

XML IntelliSense in V Isual Basic—MSDN—Visual Studio 2010.*

Using Transact-SQL Code Snippets—Visual Studio 2010.*

Schema Matching for Context-Aware Computing—Authors: Wenwei Xue et al.—UbiComp'08, Sep. 21-24, 2008, Seoul, Korea.*

Kelly, et al., "A Context-Aware Analysis Scheme for Bloom's Taxonomy", In Proceedings of the 14th IEEE International Conference on Program Comprehension, Jun. 26, 2006, pp. 275-284.

"XML IntelliSense in Visual Basic", Retrieved on: Aug. 30, 2011, Available at: http://msdn.microsoft.com/en-us/library/bb531325.aspx.

"Metadata-based Intellisense", Retrieved on: Aug. 30, 2011, Available at: http://www.nikhilk.net/MetadataBasedIntellisense.aspx.

Masood, et al., "Conceptual and Context based Combination of Schema Matchers", In Proceedings of 4th International Conference on Emerging Technologies, Oct. 18-19, 2008, pp. 269-274.

Khoussainova, et al., "SnipSuggest: ContextAware Autocompletion for SQL", In Proceedings of the VLDB Endowment, vol. 4, Issue 1, Oct. 1, 2010, 12 pages.

Xue, et al., "Schema Matching for Context-Aware Computing", In Proceedings of the 10th International Conference on Ubiquitous Computing, Sep. 21-24, 2008, 10 pages.

\* cited by examiner

User Interface *104a*

Data Table Definition *401*

*402* Visa_Credit_Card *402a*

Recommended Schemas *403*

CHAR(16)  *403a*

CHAR(16) NOT NULL  *403b*

CHAR(16) NOT NULL CONSTRAINT check_credit_card  *403c*
CHECK (visa_credit_card LIKE '4%')'

Add Column   security_code CHAR(3) NOT NULL  *403d*

*Figure 4B*

INTELLIGENTLY RECOMMENDING SCHEMAS BASED ON USER INPUT

CROSS-REFERENCE TO RELATED APPLICATIONS

Not Applicable.

BACKGROUND

Background and Relevant Art

Many developers use integrated development environments (IDEs) to create applications. For example, developers and database administrators often use tools such as SQL Server Management Studio and Visual Studio to define database schemas for their data applications.

Such IDEs facilitate the development of applications by providing a form of auto-complete while the applications are defined. For example, a form of auto-complete known as Intellisense is provided in Visual Studio. Other forms of auto-complete are also provided in other IDEs such as in the NetBeans IDE, or in the IBM Data Studio IDE.

The auto-complete functionality provided by such IDEs is limited. The suggestions provided are extremely simple and pre-defined. For example, while a developer inputs an object name into an IDE, the auto-complete functionality can recognize the name as being an instance of a specific type of object and generate a pop-up window that displays every method or property defined for an object of that type. For example, if the object is of type "shape" and is named "square," when the developer inputs "square.", the auto-complete functionality can provide suggestions of all the possible ways to complete the expression.

In another example, when defining a database, the developer may type in a name for a column. The auto-complete functionality can identify the input as a definition of a column name and in response display every possible data type to the user that can be used for the data type of a column. For example, the suggested data types may include INT, FLOAT, CHAR, and others.

Such auto-complete functionality, however, is not intelligent. In other words, the auto-complete functionality can identify input as a column name and provide every possible data type regardless of any characteristics of the column name. For example, even if the column name were "person_name" indicating that the column is intended to contain names of people, the auto-complete functionality would still suggest all possible data types for a column including INT and FLOAT even though it would be very unlikely that a column with a name of "person_name" would contain INTs or FLOATs.

BRIEF SUMMARY

The present invention extends to methods, systems, and computer program products for intelligently recommending schemas based on user input. An intelligent auto-complete function can identify characteristics of user input and recommend schemas that are most likely to be selected by the user to complete a data structure or portion of a data structure based on the identified characteristics.

In one embodiment, user input is received at a development tool. The user input defines a portion of a data structure. One or more characteristics of the user input are identified by analyzing the user input. Based at least on the one or more identified characteristics, one or more schemas, out of a plurality of schemas, are recommended to the user. Each recommended schema is predictive of user intent for defining one or more additional portions of the data structure. Graphical data representing each of the one or more recommended schemas is displayed for user selection at the development tool. A user selection is received that selects a schema from among the one or more recommended schemas represented in the displayed graphical data. In response to the user selection of the selected schema, an additional portion of the data structure is defined in accordance with the selected schema.

In another embodiment, input is received at a development tool. The input defines a name of a column of a database. Based on one or more portions of the name, one or more data types for the data of the column are recommended. The recommendation is based on matching the one or more portions of the name of the column to one or more portions of the name of other columns defined in other schemas. Upon receiving input that selects one of the one or more recommended data types, input is added to the development tool. The input defines the selected data type as the data type for the data of the column.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
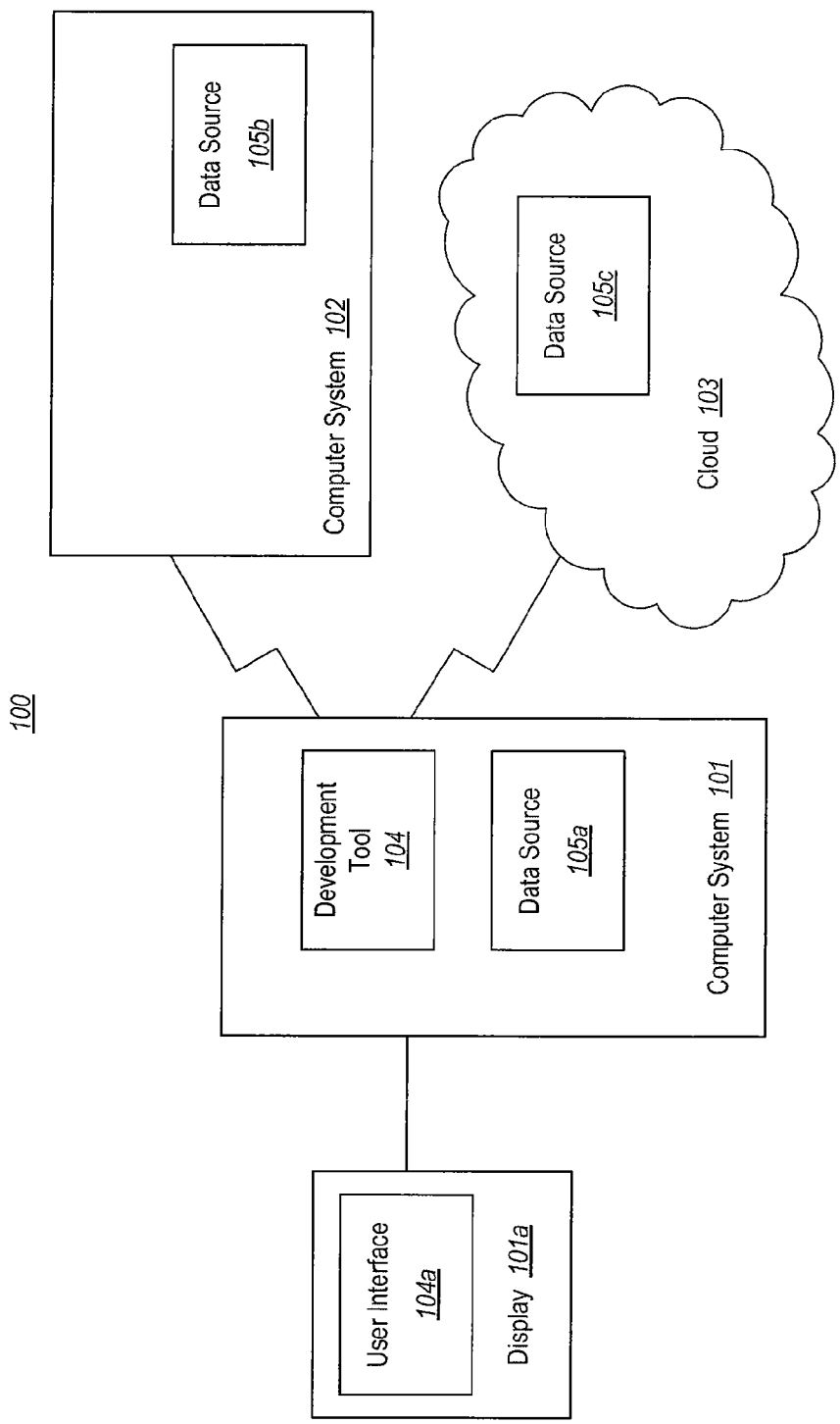
FIG. 1 illustrates an example computer architecture that facilitates intelligently recommending schemas based on user input.

The present invention extends to methods, systems, and computer program products for intelligently recommending schemas based on user input. An intelligent auto-complete function can identify characteristics of user input and recommend schemas that are most likely to be selected by the user to complete a data structure or portion of a data structure based on the identified characteristics.

In one embodiment, user input is received at a development tool. The user input defines a portion of a data structure. One or more characteristics of the user input are identified by analyzing the user input. Based at least on the one or more identified characteristics, one or more schemas, out of a plurality of schemas, are recommended to the user. Each recommended schema is predictive of user intent for defining one or more additional portions of the data structure. Graphical data representing each of the one or more recommended schemas is displayed for user selection at the development tool. A user selection is received that selects a schema from among the one or more recommended schemas represented in the displayed graphical data. In response to the user selection of the selected schema, an additional portion of the data structure is defined in accordance with the selected schema.

In another embodiment, input is received at a development tool. The input defines a name of a column of a database. Based on one or more portions of the name, one or more data types for the data of the column are recommended. The recommendation is based on matching the one or more portions of the name of the column to one or more portions of the name of other columns defined in other schemas. Upon receiving input that selects one of the one or more recommended data types, input is added to the development tool. The input defines the selected data type as the data type for the data of the column.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example computer architecture 100 that facilitates intelligently recommending schemas based on user input. Referring to FIG. 1, computer architecture 100 includes computer system 101, computer system 102, and a cloud 103 of computer systems. Computer system 101 is connected to computer system 102 and to cloud 103 over (or is part of) a network, such as, for example, a Local Area Network ("LAN"), a Wide Area Network ("WAN"), and even the Internet. Accordingly, each of the depicted computer systems as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Computer system 101 includes development tool 104 for developing data structures. For example, development tool 104 can be an IDE such as Microsoft's SQL Server Management Studio or Visual Studio, Java's NetBeans IDE, or IBM's Data Studio IDE. Development tool 104 can also be any development tool for defining or manipulating structured data. For example, the aspects of the invention could be applied during the design of a spreadsheet, and therefore development tool 104 can comprise a spreadsheet application such as Microsoft Excel. In short, the present invention extends to any development tool for defining or manipulating any form of structured data.

Computer system 101 includes display 101a for displaying user interface 104a of development tool 104. A user provides user input to user interface 104a to define a data structure such as a database or spreadsheet. As is further described below, computer system 101 can access a plurality of schemas in one or more data sources to identify one or more schemas to recommend to the user based on user input. These data sources can be stored locally on computer system 101, and/or remotely on computer system 102 or within cloud 103. For example, FIG. 1 shows data source 105a on computer system 101, data source 105b on computer system 102, and data source 105c within cloud 103. Accordingly, the present invention can be implemented using data sources stored anywhere accessible to computer system 101.

Figure 2:
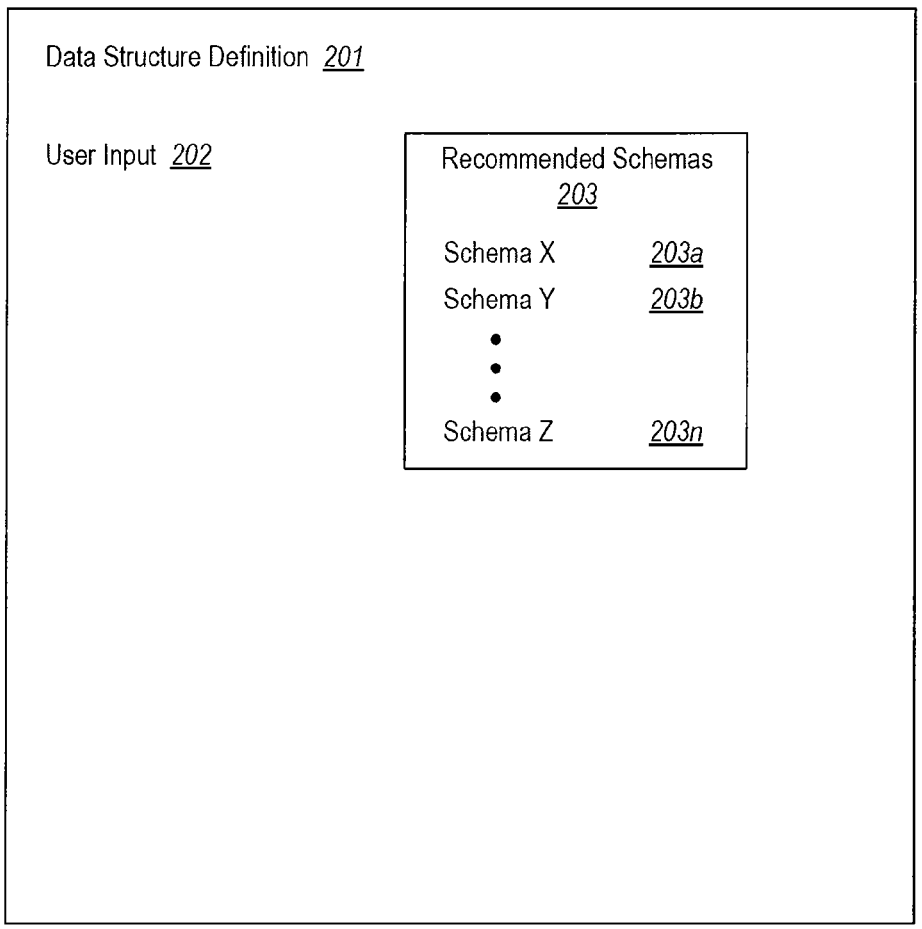
FIGS. 2-5 illustrate examples of a user interface of a development tool for intelligently recommending schemas based on user input.

FIG. 2 illustrates an example of user interface 104a. A user provides input 202 to user interface 104a to define a portion of a data structure 201. For example, if data structure 201 is a database, the portion defined by input 202 can be a column name of a table. Similarly, if data structure 201 is a spreadsheet, the portion defined by input 202 can also be a column name of the spreadsheet. The invention applies to other types of structured data as well. Further, as described below, the invention can use any defined portion of a data structure to identify and recommend schemas.

After user input 202 is received, development tool 104 analyzes user input 202 to determine one or more characteristics of user input 202. Based on this analysis, development tool 104 accesses one or more data sources which store schemas. For example, development tool 104 can access data source 105a stored locally on computer system 101, and/or access one or more remotely stored data sources such as data source 105b on computer system 102 or data source 105c within cloud 103.

Development tool 104 uses the one or more characteristics of user input 202 to identify one or more schemas within the one or more data sources that are likely to match the intent of the user. For example, the one or more characteristics can indicate that the user is likely attempting to define a database table, or a column of a database table of a certain type. Development tool 104 can then display the identified one or more schemas as recommended schemas 203 within user interface 104a.

Figure 3:
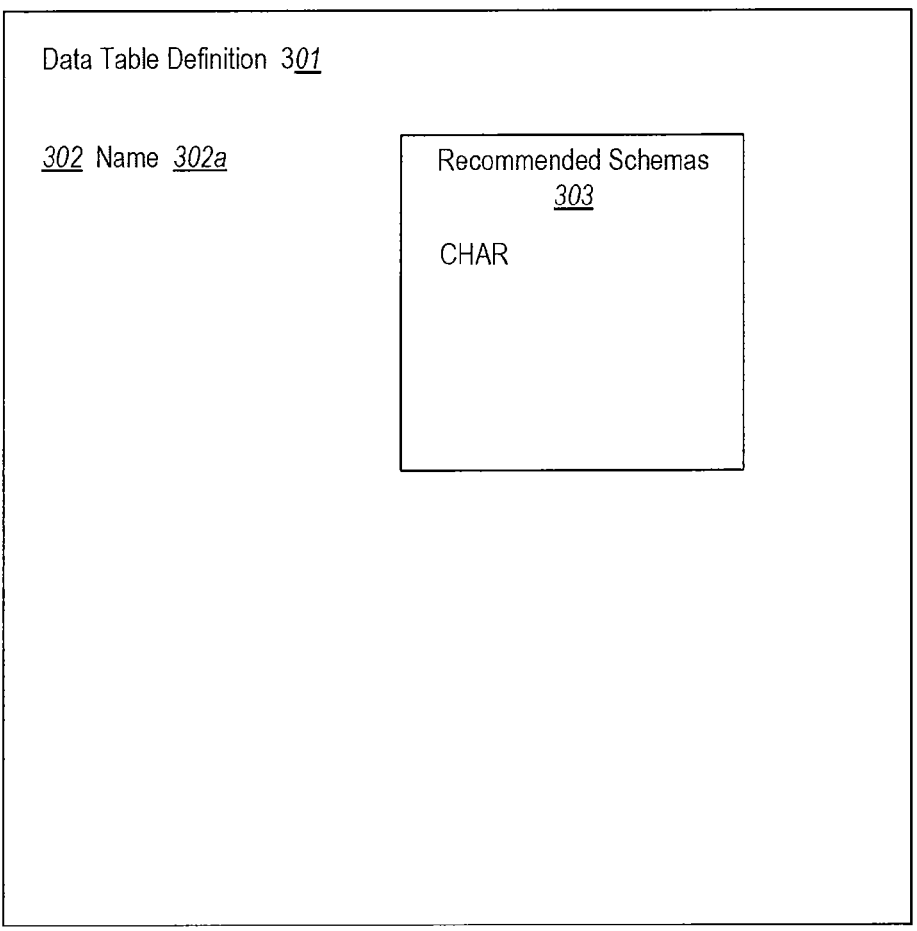

The user can then select one or more of recommended schemas 203. Upon selecting a recommended schema, development tool 104 automatically completes at least a portion of data structure 201 based on the selected schema. FIGS. 3-5 describe specific examples of how development tool 104 identifies recommended schemas and automatically completes a portion of a data structure when a recommended schema is selected.

FIG. 3 illustrates an example of user interface 104a when a user is attempting to define a database table 301 within development tool 104. As shown, the user has input "name" as the column name 302a of column 302 for database table 301. The user's actual intention in inputting "name" is to create a column for containing names of persons. As described below, the techniques of the present invention enable development tool 104 to intelligently identify and recommend schemas that are most likely to match this intent.

Each column of a database table generally must define a data type for the data that the column will contain. Rather than provide a listing of all data types available for columns as is done by traditional auto-complete tools, the present invention bases its recommendations on the context of the previously supplied user input. For example, it may be allowable for any of the data types to be specified as the data type for column 302. However, development tool 104 can identify recommended schemas to suggest one or more data types that are most likely to be selected by the user based on the context of column name 302a.

More specifically, development tool 104 can identify column name 302a as "name" and compare this characteristic of column name 302a to characteristics of a plurality of schemas stored in one or more data sources. This comparison can identify a schema that also includes a column having a name of "name" or a similar variation of this name. Development tool 104 can also identify an additional feature of the identified schema such as that each column having a column name of "name" has a defined data type of CHAR.

Accordingly, development tool 104 can provide recommended schema 303 which recommends CHAR for the data type of column 302 while not recommending INT, FLOAT, DATE, or the many other possible data types because it is unlikely that the user would select these data types as evidenced by the characteristics of the identified and recommended schemas. Of course, other schemas having different data types for columns named "name" could be identified and recommended, and therefore recommended schema 303 would include additional recommended schemas such as CHAR(30).

Upon the user selecting recommended schema 303, development tool 104 automatically completes a portion of the definition of column 302 by defining CHAR as the data type of column 302. Although this example is relatively simple, it can be seen that the present invention facilitates data structure definition by providing intelligent recommendations for auto-completion. As is described in more detail below, these recommendations can assist the user by ensuring the user that his design conforms to common design practices or policies used by other users. The recommendations can also assist the user by minimizing the number of options that are presented for auto-completion. Also, although FIG. 3 shows recommended schema 303 being a pop-up window within user interface 104a, recommended schemas can be displayed to a user in many different ways as is known in the art.

Figure 4A:
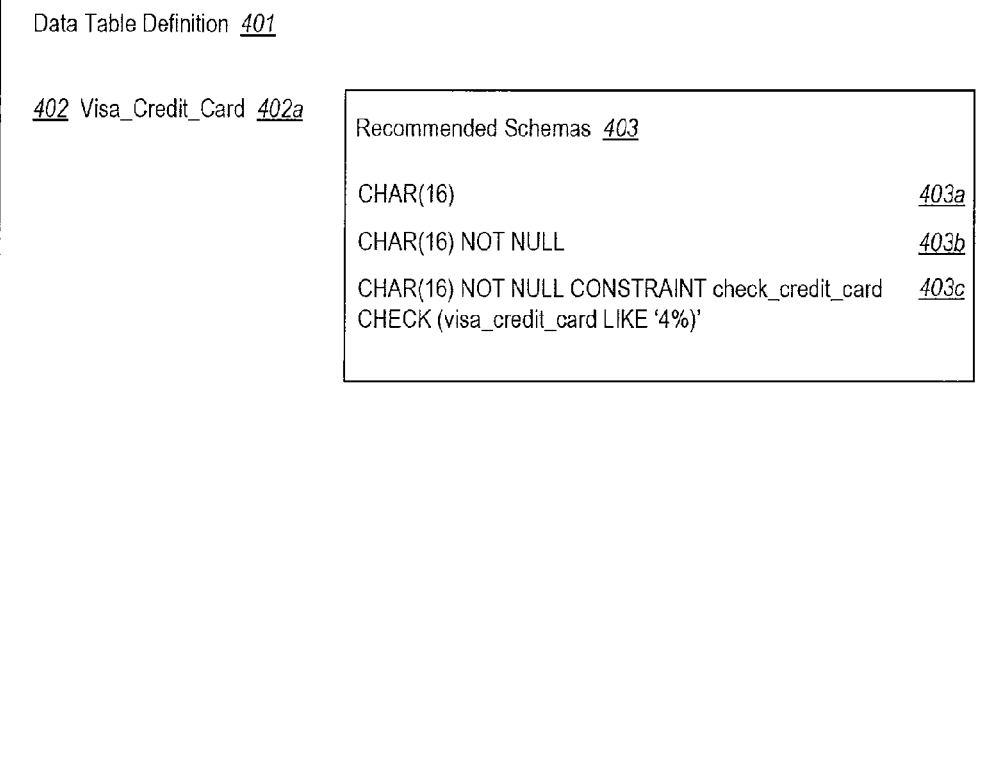
Figure 5:
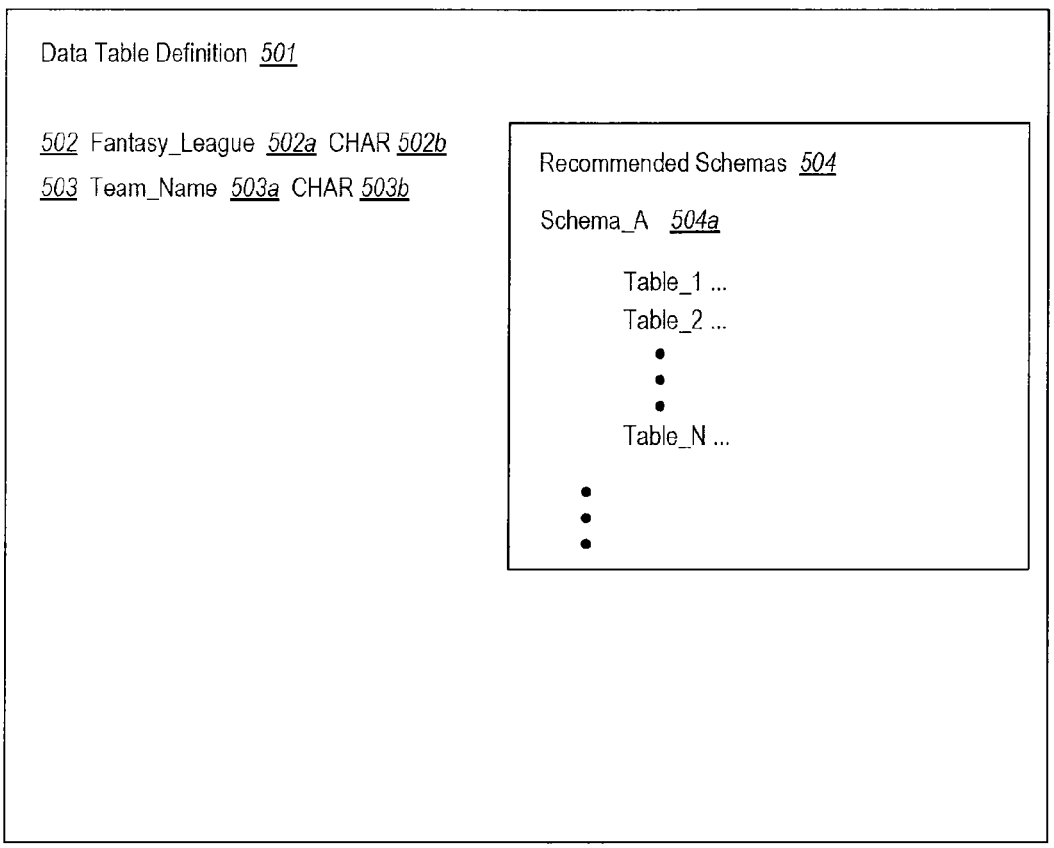

FIG. 4A illustrates another example of user interface 104a when a user is attempting to define a database table 401 for containing credit card numbers. For example, database table 401 can correspond to user accounts maintained by an online retail company. As shown, the user has input "visa_credit_card" as the column name 402a of column 402. As described above with respect to FIG. 3, development tool 104 analyzes the user input to extract one or more characteristics. In this example, the characteristics can include the entire string "visa_credit_card," or can include the individual presence of "visa," "credit," and/or "card" in the column name. These characteristics are used to identify one or more schemas that are likely to match the user's intent.

In this example, development tool 104 identifies three recommended schemas 403 that are likely to match the user's intent. For example, each of recommended schemas 403 can contain a column name similar to "visa_credit_card". A first schema 403a can define the data type of a column named with a similar name as "visa_credit_card" as CHAR(16). In contrast, a second schema 403b can define the data type as CHAR(16), NOT NULL. Further, a third schema 403c can define the data type as CHAR(16), NOT NULL with a constraint of CONSTRAINT check_credit_card CHECK (visa_credit_card LIKE '4%')'. This constraint indicates that the number of a visa credit card must start with 4.

Based on these three recommended schemas, development tool 104 can display recommended schemas 403 to the user to allow the user to select one of recommended schemas 403 for auto-completion of column 402. For example, if the user were to select schema 403*c*, the data type of column 402 would be defined as CHAR(16), NOT NULL and the defined constraint would be added to column 402.

As can be seen, the intelligent suggestions provided by development tool 104 not only facilitate auto-completion, but also assist the user to develop better data structures. For example, the user may not know that a visa credit card must start with 4 or that it must be 16 characters long. However, the intelligent suggestion of schema 403*c* informs the user of these requirements thus assisting the user to create a data structure that will only accept correctly formatted data.

Although the above examples describe auto-completion to a column currently being defined, the present invention can provide further recommendations. For example, as shown in FIG. 4B, recommended schemas 403 also include a recommendation 403*d* to add another column to table 401 named "security_code". Development tool 104 can determine to recommend this additional column based on the analysis of recommended schemas 403*a*-403*c*. Specifically, development tool 104 can determine that one or more of recommended schemas 403*a*-403*c* in addition to defining a column named similar to "visa_credit_card" also defines a column named "security_code".

Recommendation 403*d* of the additional column can be associated with one or more of recommended schemas 403*a*-403*c* or can be a separate recommendation. In other words, if the recommendation of the additional column is based on recommended schema 403*a*, then the additional column can be added if the user selects recommended schema 403*a*. In contrast, if the recommendation is a separate recommendation as is shown in FIG. 4B, the user can be required to select one of recommended schemas 403*a*-403*c* in addition to recommendation 403*d*.

Although the above examples describe the analysis of a single column name, development tool 104 can analyze any number of previously defined columns or other portions of a data structure. For example, referring to the credit card example above, if the column name were "visa" instead of "visa_credit_card", development tool 104 could determine that the column might refer to a government issued visa or a visa credit card. In this scenario, development tool 104 can beneficially make use of other portions of a database table to determine the correct intent of the user. For example, development tool 104 can determine that the database table also includes columns named "account_number" and "balance" and use these additional characteristics of the defined portion of the database table to determine that the column named "visa" is most likely a column for containing visa credit card numbers.

Specifically, development tool 104 can analyze a plurality of schemas in one or more data sources to identify schemas having columns with similar names as "account_number", "balance", and "visa". Based on the identification of these schemas, development tool 104 can recommend one or more schemas to the user for completing the definition of a portion of or the entire database table.

FIG. 5 illustrates another example of user interface 104*a* when a user is attempting to define a database for implementing a fantasy football website. As shown, the user has commenced creating the database by defining database table 501 with column 502 for containing an identifier of a fantasy league that a subscriber belongs to and column 503 for containing the team name of the subscriber's team. Column 502 is named "fantasy_league" 502*a* and is defined to accept data having a data type of CHAR 502*b*. Column 503 is named "team_name" 503*a* and is defined to accept data of data type CHAR 503*b*.

Development tool 104 can use characteristics of this input, such as the names of each column, to search for recommended schemas in one or more data sources. For example, development tool 104 can access data source 105*c* in cloud 103 to analyze a plurality of schemas in data source 105*c*. Development tool 104 can identify one or more recommended schemas 504 that include characteristics similar to those of the input provided by the user to define a portion of database table 501.

For example, a first schema 504*a*, named Schema_A, of the identified schemas can define an entire database for storing user accounts for a fantasy football website. The entire database can include various tables. Accordingly, development tool 104 can recommend first schema 504*a* for auto-completing, not just portions of database table 501, but for automatically including one or more additional tables, and any other features of a data structure including any configuration settings, triggers, enrichments to fetch data from remote data sources, visualization controls, or other features to the user's data structure definition.

For example, as shown, development tool 104 has displayed first schema 504 as a recommendation for auto-completing the input of the user. This recommendation includes the addition of multiple tables (Table_1-Table_N) as well as other data and/or settings. One of the tables within first schema 504 can correspond to database table 501 (e.g. the table can define one or more additional columns, or a data type or constraint to add to the definition of column 502 or column 503). Another of the tables within first schema 504*a* can be defined to store information of players available within a fantasy football league, another table can be defined to store stats of the players, another table can define payment information, such as credit cards or bank account numbers, for each subscriber, while another table can define viewing preferences for each subscriber. Each of these tables can be automatically added to a user's project for defining the database. These automatically created tables can also include the necessary relationships to associate the tables within the database.

As can be seen, the present invention can provide recommended schemas that when selected auto-complete a small or a large portion of a table or database definition. Also, although the above examples refer to databases and database tables, the same inventive concepts can be applied when a spreadsheet or other structured data is being defined. For example, if a user defines one or more column names for a spreadsheet, development tool 104, or a similar development tool, can use the one or more column names to identify and recommend schemas that are most likely to match the user's intent. These recommended schemas, when selected, can add columns to the spreadsheet, add additional sheets, define formulas within particular cells, apply formatting, or any other type of customization that can be made to a spreadsheet.

For example, if a user has input names for three columns in a spreadsheet, development tool 104 can identify that many other users have created spreadsheets with the same three columns in addition to other columns. Development tool 104 can then recommend a schema that defines the other columns so that when selected, the other columns are automatically added to the spreadsheet.

The above description of the invention describes development tool 104 as accessing and analyzing a plurality of schemas to identify schemas to recommend. Development tool 104 can function in this manner when the plurality of schemas is generated in advance for use by development tool 104. For example, each of the accessed data sources can be a repository of defined schemas. In contrast, in some embodiments, development tool 104 can generate schemas on the fly as described below.

Pre-defined schemas can be generated in various ways. For example, a schema can be defined directly by administrators of the development platform. Such administrators can examine data structures (such as data structures stored within cloud 103 (e.g. database definitions defined using Microsoft SQL Azure)) to determine common definitions used for specific types of data structures and create schemas accordingly. Alternatively, the development platform can provide a way for a community of developers to submit proposed schemas to be included in the plurality of schemas accessed by development tool 104. In this scenario, the development platform can also provide a way for other developers in the community to review and critique the proposed schemas prior to their inclusion.

In contrast, schemas can be generated automatically by examining many data structures accessible to the development platform. For example, the development platform may have access to data structures that are stored in cloud 103 or a portion of cloud 103. The development platform can analyze these data structures to identify common characteristics of the data structures and generate schemas based on these common characteristics. The generated schemas can then be included in the data sources for storing schemas. For example, the development platform can determine that many database tables include a column named with some variation of "visa_credit_card" and extract characteristics shared in common by such tables, such as columns that commonly appear in these tables (e.g. "security_code"), data types of columns, or constraints on data of columns.

In one or more embodiments, development tool 104 can also be configured to generate schemas on the fly such as in response to user input to development tool 104. For example, when user input is received that defines a column name, development tool 104 can access data structures (such as data structures stored in cloud 103) and analyze the data structures to determine if any of them also include a column having the same name as the column defined by the user input. Based on this analysis, development tool 104 can identify that many data structures having a column with a similar name also define other columns. Development tool 104 can then generate a schema that matches the common features of these other data structures, such as the columns that they share in common. This schema can then be displayed to the user.

Accordingly, schemas used by development tool 104 to make recommendations can be generated at different times, can be generated based on actual data structures, can be directly defined by administrators or a community of developers, or in any other suitable way. Additionally, the schemas and any data structures from which they are generated can be stored in any location. For example, a distributed data source, such as in cloud 103, can store the plurality of schemas accessed by many instances of development tool 104 being used in many locations around the world, and a localized data source can store an enterprise's recommended schemas within a LAN of the enterprise. Additionally, development tool 104 can access multiple data sources to identify schemas to recommend such as a distributed general data source and an enterprise specific data source.

Development tool 104 can also be used to encourage conformance with various policies or to enforce such policies. For example, an enterprise can define schemas that are to apply to any data structure created by its employees. As an example, an enterprise can define a schema that is recommended anytime a column for storing a credit card number is defined. The recommended schema can require that the column be encrypted.

Such policy schemas can be applied separately from other recommended schemas. For example, when creating a table for storing visa credit cards, development tool 104 can suggest recommended schemas 403a-403c as described above, but can also provide a separate suggestion that a policy schema that recommends encrypting the data be applied to the table as well. Alternatively, policy schemas can be combined with any recommended schemas prior to presenting the recommended schemas to the user so that if the user selects a recommended schema, the policy schema will also be automatically applied.

Development tool 104 can also generate telemetry data for tracking the selection of recommended schemas (or similarly the conformance of a data structure to a recommended schema by examining defined data structures). With regards to enforcing polices, development tool 104 can track when an enterprise's recommended schemas are selected (or otherwise conformed to), and when they are not, to monitor whether its employees are following the policy. Development tool 104 can also automatically provide a warning to the user if the user chooses not to select an enterprise's recommended schema notifying the user that his data structure does not conform to a required policy.

Similarly, tracking the selection or use of schemas in this manner enables the enterprise to more easily maintain consistency in its data structures. For example, if the enterprise has a policy that any table for storing credit card numbers in any application must conform to a particular schema, development tool 104 can monitor and report whether the policy is being followed.

The telemetry data can also be used to track which schemas are selected most often as well as which schemas are not selected. This telemetry data can subsequently be used by development tool 104 to identify schemas to recommend.

For example, if a particular schema is repeatedly ignored by users, the schema can be recommended less frequently, or not at all, even if it has characteristics that match characteristics of a user's input. On the other hand, if a particular schema is regularly selected, the schema can be recommended more frequently. In other words, the telemetry data can be used to improve the development tool's ability to recommend schemas that are most likely to match a user's intent.

This use of telemetry data can be at an enterprise or at a platform-wide level. For example, an enterprise may desire to track telemetry data regarding its employees' use or selection of particular schemas. Similarly, the platform can generate telemetry data representing the use or selection of schemas by all users of the platform.

Figure 6:
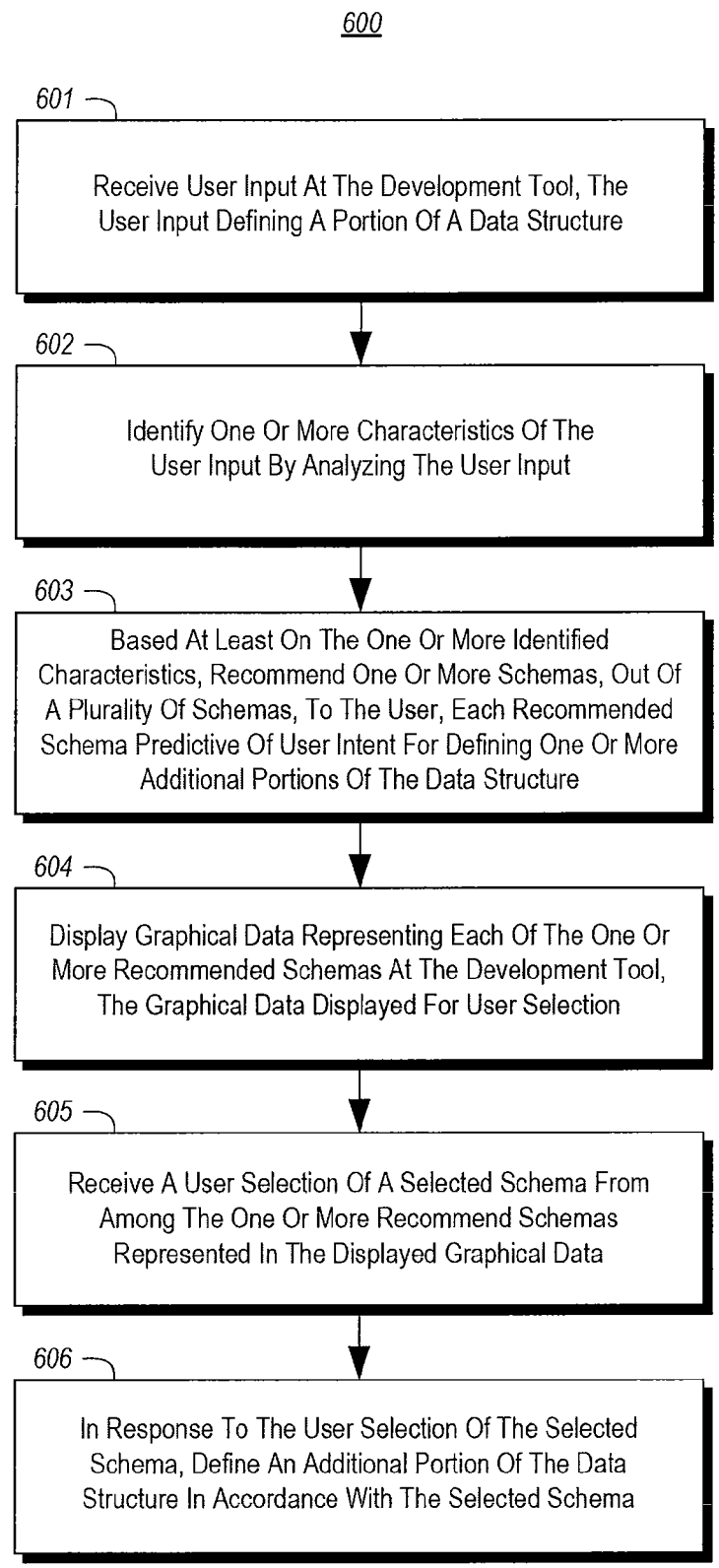
FIG. 6 illustrates a flow chart of an example method for recommending schemas to a user during the development of a data structure.

FIG. 6 illustrates a flow chart of an example method 600 for recommending schemas to a user during the development of a data structure. Method 600 will be described with respect to the components and data of computer architecture 100 as described in FIG. 2.

Method 600 includes an act 601 of receiving user input at the development tool, the user input defining a portion of a data structure. For example, development tool 104 can receive user input 202 which defines a portion of data structure 201.

Method 600 includes an act 602 of identifying one or more characteristics of the user input by analyzing the user input. For example, development tool 104 can identify user input 202 as a name of a column of data structure 201.

Method 600 includes an act 603 of, based at least on the one or more identified characteristics, recommending one or more schemas, out of a plurality of schemas, to the user, each recommended schema predictive of user intent for defining one or more additional portions of the data structure. For example, development tool 104 can determine that schemas 203a-203n match the predicted intent of the user and recommend any of schemas 203a-203n to the user.

Method 600 includes an act 604 of displaying graphical data representing each of the one or more recommended schemas at the development tool, the graphical data displayed for user selection. For example, development tool 104 can display recommended schemas 203 within user interface 104a.

Method 600 includes an act 605 of receiving a user selection of a selected schema from among the one or more recommended schemas represented in the displayed graphical data. For example, development tool 104 can receive a user selection of recommended schema 203a displayed within user interface 104a.

Method 600 includes an act 606 of in response to the user selection of the selected schema, defining an additional portion of the data structure in accordance with the selected schema. For example, development tool 104 can add input to the definition of data structure 201 to define a data type for a column, define one or more additional columns, define one or more additional tables, etc.

Figure 7:
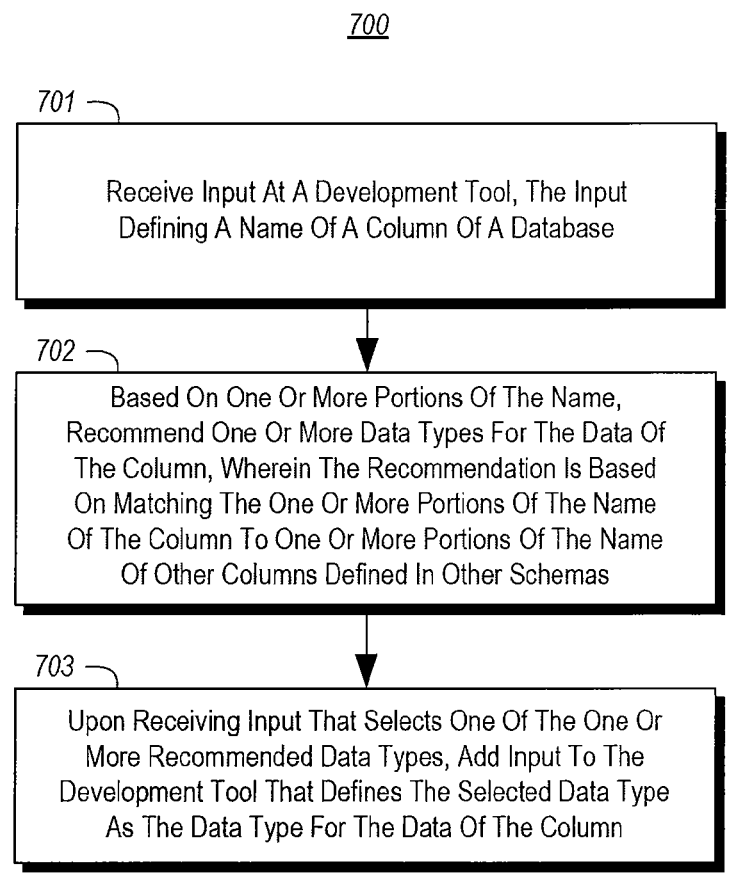
FIG. 7 illustrates a flow chart of an example method for suggesting intelligent auto-completion to a user during the development of a data structure.

FIG. 7 illustrates a flow chart of an example method 700 for suggesting intelligent auto-completion to a user during the development of a data structure. Method 700 will be described with respect to the components and data of computer architecture 100 as described in FIG. 3.

Method 700 includes an act 701 of receiving input at a development tool, the input defining a name of a column of a database. For example, development tool 104 can receive user input that defines the name 302a of a column 302.

Method 700 includes an act 702 of, based on one or more portions of the name, recommending one or more data types for the data of the column, wherein the recommendation is based on matching the one or more portions of the name of the column to one or more portions of the name of other columns defined in other schemas. For example, development tool 104 can recommend CHAR as the data type for column 302 based on a comparison to schemas stored in data store 105c that also include a column with the same column name.

Method 700 includes an act 703 of upon receiving input that selects one of the one or more recommended data types, adding input to the development tool that defines the selected data type as the data type for the data of the column. For example, development tool 104 can receive user input that selects CHAR for the data type, and can automatically add input to the definition of column 302 that defines the data type of column 302 as CHAR.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system including one or more processors and system memory, the computer system including a development tool for defining data structures, a method for recommending schemas to a user during the development of a data structure, the method comprising:
    receiving user input at the development tool, the user input defining a portion of a data structure;
    identifying one or more characteristics of the user input by analyzing the user input;
    based at least on the one or more identified characteristics, recommending one or more schemas, out of a plurality of schemas, to the user, each recommended schema predictive of user intent for defining one or more additional portions of the data structure;
    displaying graphical data representing each of the one or more recommended schemas at the development tool, the graphical data displayed for user selection;
    receiving a user selection of a selected schema from among the one or more recommended schemas represented in the displayed graphical data; and
    in response to the user selection of the selected schema, defining an additional portion of the data structure in accordance with the selected schema.

2. The method of claim 1, wherein the portion of the data structure defined by the input is a name of a column of the data structure.

3. The method of claim 2, wherein the data structure is one of a database or a spreadsheet.

4. The method of claim 2, wherein identifying one or more characteristics of the input comprises matching at least a portion of the name of the column to at least a portion of the name of one or more other columns used in the one or more recommended schemas.

5. The method of claim 1, wherein at least one of the plurality of schemas is stored in a dataset in a cloud of computing systems, the method further comprising accessing the dataset in the cloud of computer systems to analyze the at least one of the plurality of schemas to identify whether to recommend the at least one of the plurality of schemas.

6. The method of claim 1, further comprising analyzing one or more characteristics of previous input that define other portions of the data structure; and
    wherein recommending one or more schemas comprises recommending the one or more schemas based on one or more characteristics identified from previous user input.

7. The method of claim 6, wherein the previous user input comprises the name of another column of the data structure.

8. The method of claim 1, wherein adding an additional portion of the data structure as defined within the selected schema comprises adding a definition of a data type of data that is to be stored within the additional portion of the data structure.

9. The method of claim 1, wherein adding an additional portion of the data structure as defined within the selected schema comprises adding one or more constraints on data that is to be stored within the additional portion of the data structure.

10. The method of claim 1, wherein adding an additional portion of the data structure as defined within the selected schema comprises adding input that defines one or more additional columns of the data structure.

11. The method of claim 1, further comprising prior to recommending the one or more schemas:

analyzing a store of schemas to determine common characteristics of schemas in the store; and based on the common characteristics, generating the plurality of schemas.

12. The method of claim 1, wherein at least one of the recommended one or more schemas is associated with a policy, the method further comprising:

in response to user selection of the selected schema, generating telemetry information that identifies the selected schema from among the one or more recommended schemas including identifying whether the user selected the at least one schema that is associated with the policy; and using the telemetry information to refine the identification of recommended schemas during the creation of subsequent data structures and to determine whether the policy is being implemented.

13. At a computer system including one or more processors and system memory, a method for suggesting intelligent auto-completion to a user during the development of a data structure, the method comprising:

receiving input at a development tool, the input defining a name of a column of a database;

based on one or more portions of the name, recommending one or more data types for the data of the column, wherein the recommendation is based on matching the one or more portions of the name of the column to one or more portions of the name of other columns defined in one or more schemes, and recommending one or more additional columns to be included in the database, the one or more additional columns including a name and a data type; and upon receiving input that selects one of the one or more recommended data types, adding input to the development tool that defines the selected data type as the data type for the data of the column.

14. The method of claim 13, further comprising based on the one or more portions of the name, recommending one or more constraints on data that is to be stored in the column.

15. The method of claim 13, wherein the recommendation is further based on one or more other columns that are already defined for the database.

16. At a computer system including one or more processors and system memory, a method for facilitating the development of a data structure, the method comprising:

receiving input to a development tool, the input defining the name of a column of a database;

comparing at least a portion of the name to names of columns in a plurality of schemas;

identifying one or more schemas, in the plurality of schemas, that each include a column having a name with at least a portion that matches the at least a portion of the name of the column input to the development tool;

determining a data type of the data of each of the one or more identified columns;

determining one or more additional columns that are included in each of the one or more schemas;

displaying the data type of the data of each of the one or more identified columns as recommended data types for the column of the database being defined in the development tool; and displaying the one or more additional columns as recommended columns to be included in the database being defined in the development tool.

17. The method of claim 16, wherein the database is defined in the development tool to include one or more other columns, and wherein identifying one or more schemas in the plurality of schemas that each include a column having a name with at least a portion that matches the at least a portion of the name of the column input to the development tool further comprises:

identifying one or more schemas in the plurality of schemas that each include a column having a name with at least a portion that matches the at least a portion of the name of the column input to the development tool, and that each include at least one of the one or more other columns of the database defined in the development tool.

18. The method of claim 16, further comprising:

displaying the one or more schemas as recommended schemas for the database; and upon the user selecting one of the one or more schemas, adding input to the development tool that defines the database to conform to the selected schema.

19. The method of claim 18, wherein the schema includes a name and data type for each of a plurality of columns of one or more tables of the database and one or more of the following:

one or more stored procedures;

one or more triggers; or one or more constraints.

* * * * *